United States Patent [19]

Bell

[11] 4,207,604
[45] Jun. 10, 1980

[54] CAPACITIVE PRESSURE TRANSDUCER WITH CUT OUT CONDUCTIVE PLATE

[75] Inventor: Robert L. Bell, Chatsworth, Calif.

[73] Assignee: Kavlico Corporation, Chatsworth, Calif.

[21] Appl. No.: 898,518

[22] Filed: Apr. 20, 1978

Related U.S. Application Data

[63] Continuation-in-part of Ser. No. 746,853, Dec. 2, 1976, Pat. No. 4,158,217.

[51] Int. Cl.² .............................................. H01G 7/00
[52] U.S. Cl. ................................... 361/283; 361/278
[58] Field of Search ..................... 361/278, 283, 280; 73/724

[56] References Cited

U.S. PATENT DOCUMENTS

| | | | |
|---|---|---|---|
| 2,509,310 | 5/1950 | Moreland | 361/283 X |
| 3,515,987 | 6/1970 | Zubrick | 361/280 |
| 3,634,727 | 1/1972 | Polye | 361/283 X |
| 3,710,209 | 1/1973 | Webb | 361/288 |
| 3,750,476 | 8/1973 | Brown | 361/283 X |
| 3,808,480 | 4/1974 | Johnston | 361/283 |
| 4,064,550 | 12/1977 | Dias | 361/283 |

FOREIGN PATENT DOCUMENTS

2021479 5/1970 Fed. Rep. of Germany .......... 361/283

Primary Examiner—E. A. Goldberg
Attorney, Agent, or Firm—Gipple & Hale

[57] ABSTRACT

A capacitive pressure transducer comprising a pair of disc shaped members having planar surfaces made from an insulator material, one of the members being several times thinner than the other plate and flexible and constituting a diaphragm and the other thicker plate constituting a stationary plate. A thin conductive film is formed on the surface of each of the members to form the plates of the capacitor. A glass frit is applied on the marginal edge of each member and when the members are held in adjacent relationship, the assembly is fired to seal the two members together while spacing them a predetermined distance apart so that the two cnductive plates are opposite each other and are separated by an open gap of a predetermined distance, the two conductive plates being insulated one from the other. Leads are electrically connected to the conductive plate of each disc through the fused glass frit. When pressure is applied to the member, the diaphragm member is displaced thereby changing the capacitance of the pressure transducer.

4 Claims, 14 Drawing Figures

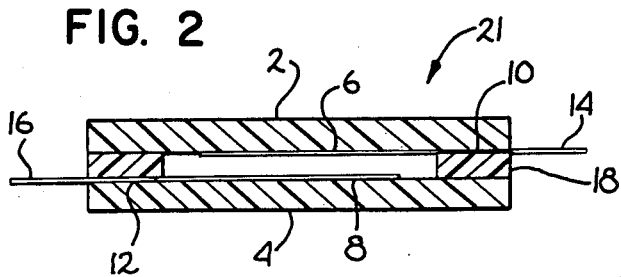
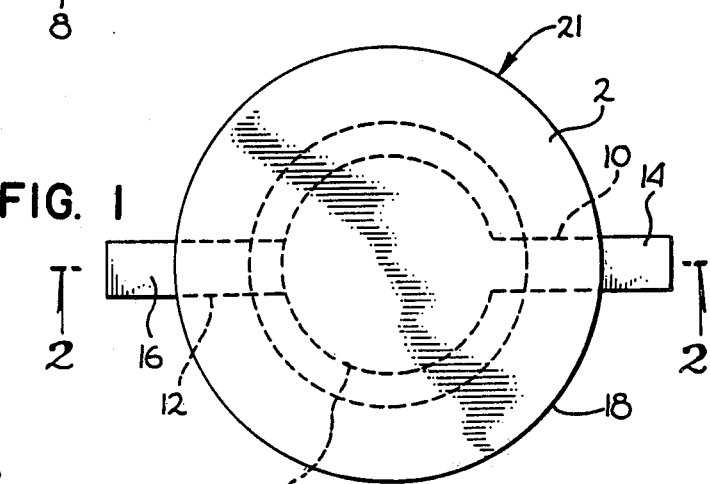
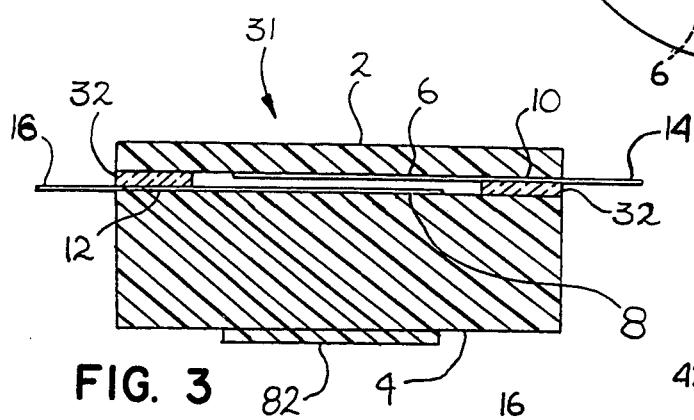
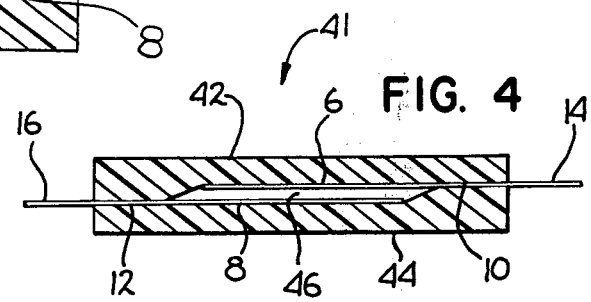
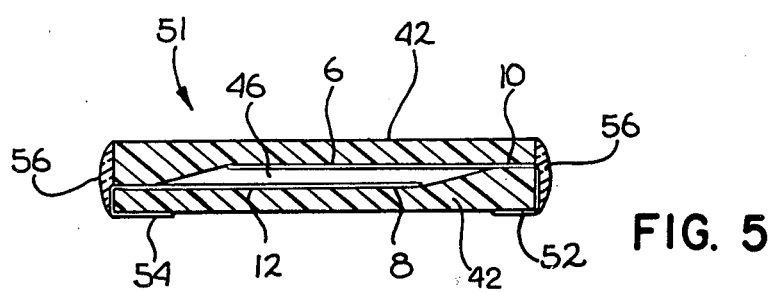

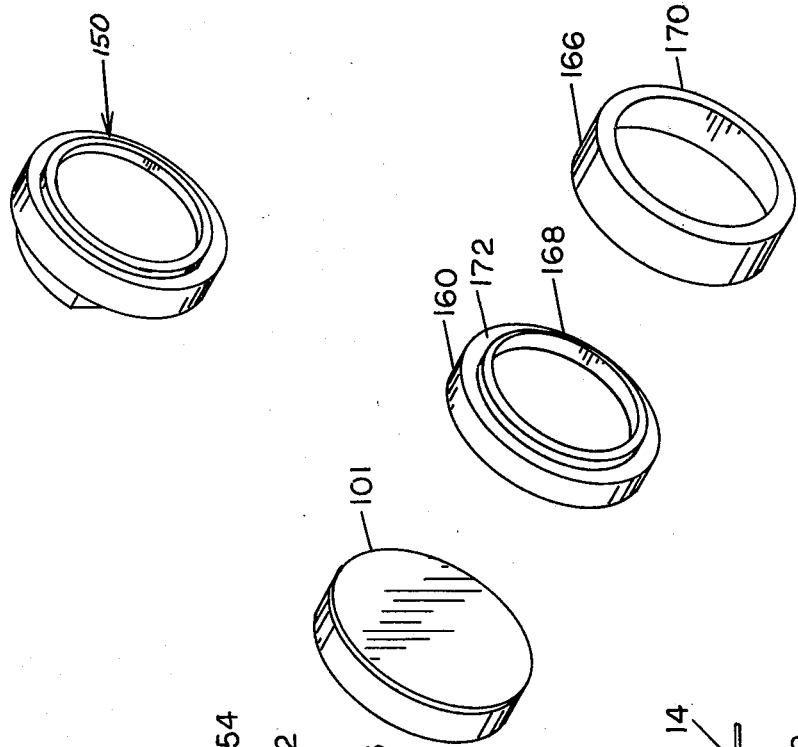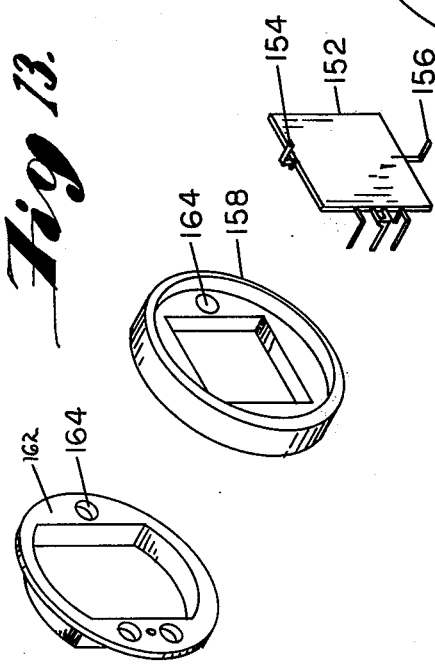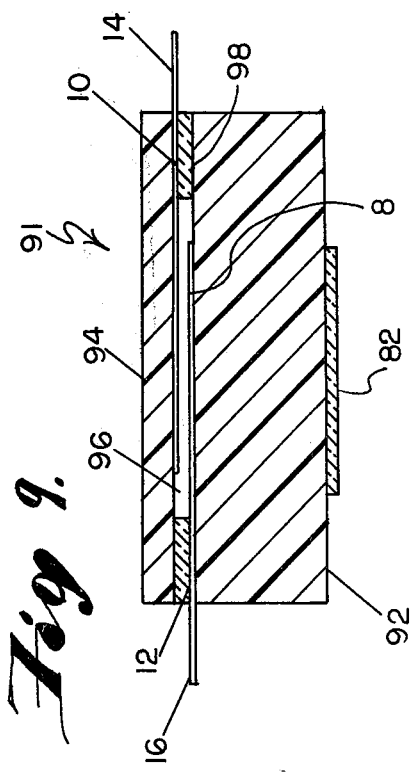

CAPACITIVE PRESSURE TRANSDUCER WITH CUT OUT CONDUCTIVE PLATE

RELATED APPLICATIONS

This application is a continuation-in-part application of U.S. application Ser. No. 746,853 filed Dec. 2, 1976 now U.S. Pat. No. 4,158,217 issued June 12, 1979.

FIELD OF INVENTION

This invention relates to pressure transducers and more particularly to capacitive type pressure transducers utilized in conjunction with electronic circuits.

DESCRIPTION OF THE PRIOR ART

It is frequently necessary to determine the pressure of gases and liquids for purposes of measurement or control. Furthermore, it is also frequently necessary to provide means for sensing the pressure of fluids and gases in engines, machinery and equipment. Accordingly, there exists in the prior art many devices for measuring pressure. One type of such device uses the piezoelectric principle. When pressure is applied to the piezoelectric device, a voltage which is proportional to the pressure applied is generated by the device. While the piezoelectric device does allow one to measure pressure, it is best used only for measuring changes in pressure and not static pressure. Furthermore, piezoelectric devices are relatively insensitive and have a low accuracy.

Another device for measuring pressure is the strain gauge. Strain gauges are resistive devices in which resistance changes in a manner related to the pressure applied thereto. Strain gauge devices can measure static pressure but there is a small percentage change for large pressure changes. Furthermore, strain gauges lack stability with temperature and time.

Another type of device utilizes resilient resistive materials which change resistance in proportion to the pressure applied thereto. Such devices also measure static pressure and are more sensitive than the piezoelectric devices but also lack stability with temperature and time.

There are also capacitive devices whose capacitance varies with changes in pressure. These capacitive devices have better stability with temperature and time than those devices previously discussed and are more sensitive than strain gauges, but require a very complex manufacturing procedure and as such are very expensive. Furthermore, since such devices typically utilize different materials, there are problems created by the different rates of thermal expansion resulting in a lack of measurement uniformity.

Still another type of pressure sensor in use today utilizes a capacitive type transducer which includes a diaphragm on which a conductive plate is mounted, the diaphragm being arranged in operative association with another conductive plate which may be deflectable or stationary. These two plates are suitably disposed in spaced-apart relationship to form the plates and thus the capacitance of the transducer as a function of pressure. The capacitor plates are coupled into a suitable electrical network so that the changes in capacitance are transformed into output signals which reflect the magnitude of the pressure measured by the transducer.

One conventional type of such capacitive-type pressure transducer utilizes a pair of complementary members which are sealed together to form a unitary structure. The members are shaped to define a hollow interior and the adjacent surfaces of the members within the interior are provided with a planar conductive material to form the two plates of a capacitor. One of the members generally comprises the flexible diaphragm with the other member being formed of rigid material. Such a capacitive-type pressure transducer is shown in U.S. Pat. No. 3,748,571 wherein a diaphragm having a surface coated with a layer of conductive material, is provided. The diaphragm is supported by a cup member bonded in sealed relationship to another cup member so that the conductive layer in the diaphragm is disposed in spaced relationship with a layer of conductive material formed on the surface of the other cup member. The conductive layers form the plates of a capacitor, the spacing of which is varied by the flexing of the diaphragm. The capacitor formed by the conductive layers is connected by means of leads extending through the cup members for connection at one end to the conductive layers and to an associated electrical network from which output signals, as determined by the spacing of the capacitor plates are obtained.

A similar pressure sensor construction is shown in U.S. Pat. No. 3,952,234 wherein spaced capacitor plates are provided on a diaphragm and stationary plate respectively to form a differential capacitor, the stationary plate being provided with a pair of plates to compensate for imbalance of the capacitor during deflection of the diaphragm. In U.S. Pat. No. 3,750,476, the pressure transducer utilizes capacitor plates formed by metallic coatings on a rod and a tube in which the rod is disposed. A suitable annular space is provided between the rod and tube to form a capacitor gap. Flexing of the outer tube with pressure varies the spacing between the sleevelike capacitor plates providing a signal corresponding to the pressure sensed. All of the aforementioned capacitive-type pressure transducers utilize discrete conductors which are conducted through suitably provided passages in the housing or support structure in which the capacitor is housed and must be connected to the plates by a process such as soldering or the like. The requirement of such passages and separate leads materially increased the complexity of the transducer and adds to the manufacturing cost. Furthermore, such designs decrease the sensitivity of the capacitor and/or its linearity over the operating range of the capacitor.

Applicants are also aware of the use of a glass frit to seal electronic devices together. However, applicants are not aware of the use of a glass frit to seal and separate capacitor plates as envisioned in the present invention.

SUMMARY OF THE INVENTION

A capacitive pressure transducer constructed with a unique combination of a pair of planar disc shaped plates made from an insulating material. An electrically conductive film is screened onto each of the plates to form the plates of a capacitor and conductive areas accessible for lead attachment, and glass frit is placed on the marginal portion of the discs so that when the discs are placed together in an overlying relationship such that the two conductive films are opposite each other, the glass frit is fired to seal the discs together and space them apart so that they are separated by an open gap of predetermined distance and are insulated from each other. One of the discs being thin enough to be flexible, functions as a diaphragm, while the other thicker plate is relatively rigid. In the preferred embodiment the rigid plate has an electrically conductive film screened on its planar surface with a central cut out section which prevents bottoming out of the diaphragm.

When pressure is applied to the diaphragm, the diaphragm is displaced thereby changing capacitance which can be detected by an electronic circuit as an indication of the value of the pressure applied to the capacitive pressure transducer.

Thus it can be seen that the present invention provides a capacitive pressure transducer which is reliable, easy to manufacture and low in cost.

The construction of the invention results in a simplified method of making a capacitive pressure transducer which is very sensitive to changes in pressure with a high degree of accuracy and stability over long periods of time and under wide temperature ranges.

BRIEF DESCRIPTION OF THE DRAWINGS

The above-mentioned description of the invention and other features and objects of the present invention will become more apparent by reference to the following description taken in conjunction with the accompanying drawings, wherein like reference numerals denote like elements and in which:

FIG. 1 is a top plan view of a capacitive pressure transducer in accordance with the teachings of the present invention;

FIG. 2 is a cross-section of the embodiment of FIG. 1 taken along the 2—2 line;

FIG. 3 is another embodiment of a capacitive pressure transducer in accordance with the teachings of the present invention shown in cross-section;

FIG. 4 is a third embodiment of a capacitive pressure transducer in accordance with the teachings of the present invention shown in cross-section;

FIG. 5 is a fourth embodiment of a capacitive pressure transducer in accordance with the teachings of the present invention shown in cross-section;

FIG. 9 is a specific embodiment of a capacitive pressure transducer derived from FIGS. 3 and 8 in accordance with the teachings of the present invention shown in cross-section;

FIG. 13 is an exploded perspective view of the pressure transducer assembly utilizing the pressure transducer shown in FIGS. 10-12; and FIG. 14 is a perspective view of the assembled pressure transducer of FIG. 13.

DESCRIPTION OF THE PREFERRED EMBODIMENT

Figure 6:
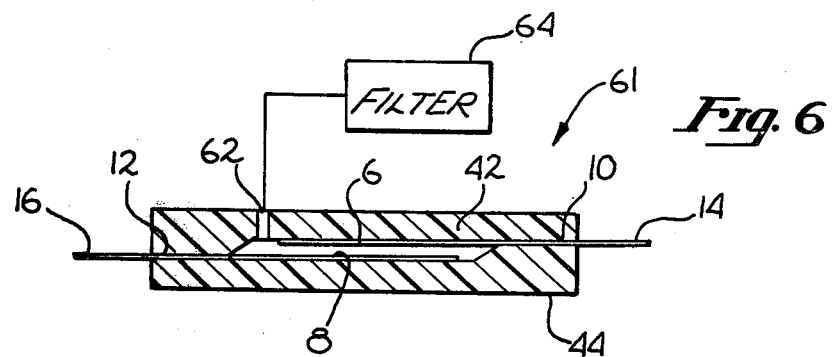
FIG. 6 is a fifth embodiment of a capacitive pressure transducer in accordance with the teachings of the present invention shown in cross-section.

Referring more specifically to the drawings, FIGS. 1 and 2 are an embodiment of a capacitive pressure transducer in accordance with the principles of the present invention.

In FIGS. 1 and 2, the capacitive pressure transducer includes two plates in the form of thin planar surfaced discs 2 and 4 made from a nonconductive or insulating material. Each of the discs 2 and 4 has a thin central electrically conductive metalized layer 6 and 8. The central electrically conductive layers 6 and 8 are substantially circular in shape with substantially identical parallel diameters. Other conductive layers 10 and 12 are metalized respectively onto each of the discs 2 and 4 and form a conductive path from the central layers 6 and 8 to the outer edge of discs 2 and 4. Leads 14 and 16 are coupled and electrically connected to conductive layers 10 and 12 respectively.

The capacitive pressure transducer 21 is assembled by bonding one side of both discs 2 and 4 to a spacer member 18 made from a nonconductive or insulating material so that the central conductive layers 6 and 8 are positioned opposite each other and separated by a gap 7.

In practice discs 2 and 4 and spacer member 18 may be made from any nonconductive material but the material selected for each part should be the same material or a substantially similar material. In this embodiment the nonconductive or insulating material is preferably one which has approximately a zero hysteresis, such as alumina, fused silica, or glass such as Pyrex. Furthermore, the conductive layers may be plated on, etched on, sputtered on, screened on and fired, or applied in any other manner well known in the art. Since in some applications an absolute pressure measurement is required, the gap 7 between conductive layers 6 and 8 which form the plates of the capacitor may be evacuated. Also discs 2 and 4 can be bonded to spacer member 18 by applying a small amount of glass frit between each of the three members and firing the assembled pressure transducer to fuse the glass frit thereby forming a seal. In the aforementioned embodiment, the conductive layers are screened onto the discs 2 and 4 using a conductive paste and a small amount of sealing material applied between the discs 2 and 4 and spacer member 18. The sealing material is preferably a glass frit but may be a ceramic based sealing material. The thus assembled pressure transducer is then fired to seal the respective members and complete the assembly.

In operation when pressure is applied to the capacitve transducer 21, one or both discs act as a diaphragms and the spacing or gap 7 between the discs changes. When the two discs deflect under pressure the capacitance of the transducer changes. Hence the capacitance changes as a function of pressure and the transducer can be calibrated such that any specific capacitance equals some specific pressure applied to the transducer. The change in capacitance can be measured by many of several different types of electronic circuits which exist in the art. One of such devices is an A.C. Wheatstone reactance bridge which is well known in the art.

In FIG. 3 another embodiment of a capacitance pressure transducer is shown in accordance with the teachings of the present invention. The embodiment of FIG. 3 is similar to that shown in FIGS. 1 and 2 and accordingly is only shown in cross-section. In FIG. 3 like reference numerals denote like elements of the embodiment of FIGS. 1 and 2.

In FIG. 3 central conductive layers 6 and 8 of substantially circular shape are applied onto the discs 2 and 4. Also conductive layers 10 and 12 are applied respectively onto each of the discs 2 and 4 and form a conductive layer from the central layers 6 and 8 to the outer edge of discs 2 and 4. Similarly, leads 14 and 16 are coupled respectively to conductive layers 10 and 12.

The capacitive pressure transducer 31 is assembled by applying a glass frit (or ceramic sealing material) 32 in the vicinity of the perimeter of the surface(s) of disc(s) 2 and/or 4 onto which central conductive layer(s) 6 and/or 8 was previously applied. Disc 2 is then placed on top of the disc 4 with conductive layer 6 opposite conductive layer 8 separated by a gap. A discussion of the thickness ranges of the gap and material coating dimensions will be discussed later on in the specification. The initially assembled capacitive pressure transducer 31 is then fired thereby fusing the glass frit 32. When the glass frit 32 is fused, discs 2 and 4 are bonded and sealed together around the periphery between them. Furthermore, in this embodiment, a spacer member such as the spacer member 18 in the embodiment of FIGS. 1 and 2 is not required thereby reducing the number of components required to assemble the pressure transducer 31.

As in the embodiments of FIGS. 1 and 2, the preferred material for discs 2 and 4 is a zero hysteresis nonconductive electrically insulative, elastic material such as alumina, fused silica, or glass such a Pyrex. Furthermore, in the preferred embodiment of the pressure transducer 31, the conductive layers are screened and fired onto the discs 2 and 4 using a conductive paste and then a glass frit is applied about the perimeter of disc(s) 2 and/or 4. Disc 2 is then placed on top of disc 4 and the thusly assembled pressure transducer is then fired to complete the assembly. Alternatively, the conductive layers 6, 8, 10 and 12 could be applied to discs 2 and 4 and glass frit 32 applied to one or both discs. The complete assembly could then be fired to seal the assembly.

In FIG. 4 a third embodiment of a capacitive pressure transducer is shown in accordance with the teachings of the present invention. The embodiment of FIG. 4 is similar to that shown in FIGS. 1 and 2 and accordingly is only shown in cross-section. In FIG. 4 like reference numerals denote like elements to the embodiment of FIGS. 1 and 2.

In FIG. 4 the capacitive pressure transducer 41 includes two nonconductive insulative plates (e.g. discs) assembled such that when placed together a gap 46 of substantially circular cross-section exists between the plates 42 and 44. Circular conductive layers 6 and 8 are applied onto the inside surfaces of plates 42 and 44. Also conductive layers 10 and 12 are applied respectively onto each of the plates 42 and 44 and form a conductive layer from the central layer 6 and 8 to the outer edge of plates 42 and 44. Leads 14 and 16 are coupled respectively to conductive layers 10 and 12.

The capacitive pressure transducer 41 is assembled by applying a small amount of glass frit about the perimeter of the inner surface of plate 44. Plate 42 is then placed on top of plate 44 with conductive layer 6 adjacent to and opposite conductive layer 8. The initially assembled capacitive pressure transducer 41 is then fired thereby fusing the glass frit. When the glass frit is fused, plates 42 and 44 are bonded together by a thin glass seal around the perimeter. Thus, only a very thin glass seal is made between the two materials and not the large seal shown in the embodiment of FIG. 3. Typically the thickness of the seal is in the order of one micro inch to one milinch or $10^{-6}$ to $10^{-3}$ inches.

As in the other embodiments, the preferred material for plates 42 and 44 is a zero hysteresis, nonconductive electrically insulative elastic material such as alumina, fused silica or glass such as Pyrex. Furthermore, in the embodiment for pressure transducer 41 the conductive layers are applied onto the plates 42 and 44 using a conductive paste and then a small amount of glass frit is applied in the vicinity of the perimeter of plate 44. Plate 42 is then placed on top of plate 44 and the assembled pressure transducer is then fired to join the two plates and fuse the glass frit to form a seal.

Figure 8:
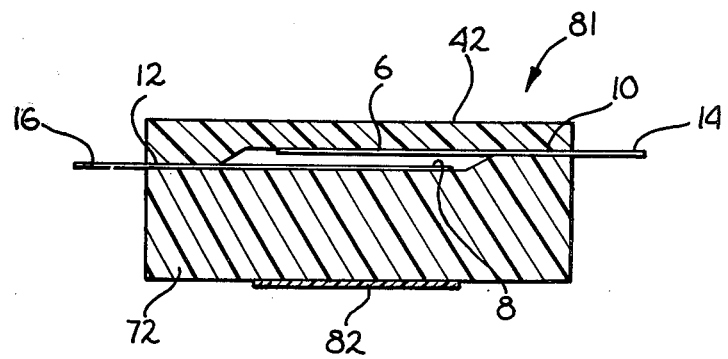
FIG. 8 is the capacitive pressure transducer of FIG. 7 provided with an electronic circuit.
Figure 10:
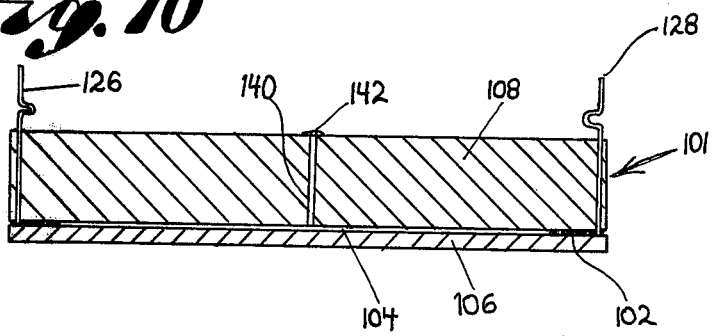
FIG. 10 is a preferred embodiment of a capacitive pressure transducer in accordance with the teachings of the present invention shown in cross-section.

Furthermore, it should be apparent to one skilled in the art that the shape of the plates 42 and 44 can take any number of forms so long as the gap 46 between the inside surfaces of the plates 42 and 44 is provided. Typically, the plates 42 and 44 may be formed so that they are thicker on one edge than another, as shown in the drawings (FIG. 4 and FIG. 5) or with one plate thicker than the other to form a stationary substrate and diaphragm assembly as shown in FIGS. 8, 9 and 10. Furthermore, the plates could be formed in the shape of a dish, concave surface, or a shape essentially the same as the delection curve of the plate(s) or disc(s) under pressure.

In FIG. 5 a fourth embodiment of a capacitive pressure transducer is disclosed in accordance with the teachings of the present invention. The embodiment of FIG. 5 is similar to that shown in FIGS. 1, 2 and 4 and accordingly is only shown in cross-section. In FIG. 5 like reference numerals denote like elements to the other embodiments.

In FIG. 5, the plates 42 and 44, conductive layers 6, 8, 10 and 12 are formed substantially as previously described. Leads 52 and 54 are coupled to conductive layers 10 and 12.

In order to assemble the capacitive pressure transducer 51, the plates 42 and 44 are placed one on top of the other with conductive layers 6 and 8 adjacent and opposite each other. The leads 52 and 54 are applied around plate 44 such that electrical contact points are available on the bottom surface of plate 44. A glass frit or preform 56 is then applied to the outside margin of the disc and the combination is then fired to fuse the glass frit. It should be noted that it is within the scope of the invention to extend leads 52 and 54 downwardly along the side of plate 44 and side braze the leads 52 and 54 to conductors 10 and 12. This variant would have application primarily where square or rectangular plates were employed.

In FIG. 6 a fifth embodiment of a pressure transducer is disclosed in accordance with the teachings of the present invention. The embodiment of FIG. 6 is similar to that shown in FIG. 4 and accordingly is shown only in cross-section. In FIG. 6 like reference numerals denote like elements to the other embodiments.

In FIG. 6, the plate 42 is provided with a vent hole 62 for venting the interior of the capacitive pressure transducer to the outside ambient pressure media. Vent hole 62 is vented to the outside media via a filter 64. In this way contaminants are prevented from entering the gap between the plates 6 and 8. In all other ways the capacitive pressure transducer 61 is made, assembled and operated in substantially the same way as the capacitive pressure transducer 41 in FIG. 4. It should be appreciated that the capacitive pressure transducer may measure either gauge pressure or absolute pressure depending upon the requirement of the particular use. Further in practice, in some practical applications the ambient media might be air, oil or other media.

Figure 7:
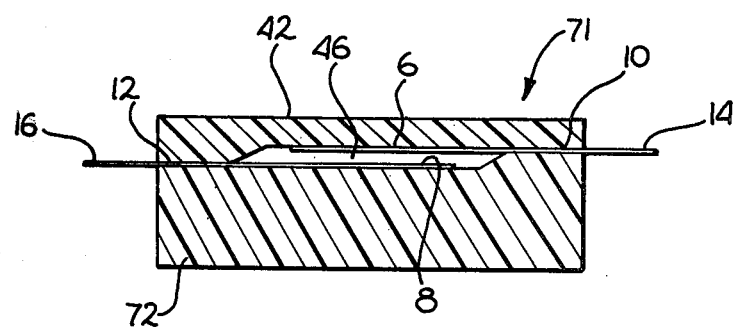
FIG. 7 is a sixth embodiment of a capacitive pressure transducer in accordance with the teachings of the present invention shown in cross-section.

In FIG. 7 a sixth embodiment of a capacitive pressure transducer is shown in accordance with the teachings of the present invention. The embodiment of FIG. 7 is similar to that shown in FIG. 4 and accordingly is only shown in cross section. In FIG. 7 like reference numerals denote like elements to the other embodiments.

In FIG. 7 the capacitive pressure transducer 71 includes two nonconductive insulative plates formed such that when placed together a gap 46 of substantially circular cross-section exists between the plate 42 and cylindrical plate 72. Cylindrical plate 72 is formed such that it is substantially thicker than plate 42. Circular conductive layers 6 and 8 are applied onto the inside surfaces of plate 42 and cylindrical plate 72. Also conductive layers 10 and 12 are applied respectively onto each of the plates 42 and 72 to form a conductive layer from the central layers 6 and 8 to the outer margin of plates 42 and 72. Leads 14 and 16 are coupled respectively to conductive layers 10 and 12.

The capacitive pressure transducer 71 is now assembled in a manner substantially the same as the capacitive pressure transducer 41 in FIG. 4.

In operation, since cylindrical plate 72 is substantially thicker than plate 42, only plate 42 acts as a diaphragm. In other words, when pressure is applied to the capacitive pressure transducer 71, in essence only plate 42 and accordingly layer 6 is displaced relative to layer 8 thereby varying the capacitance.

In FIG. 8 like reference numerals denote like elements to the embodiment of FIG. 7. In FIG. 8 is shown a capacitive pressure transducer 81 substantially the same as that shown in FIG. 7 except that the capacitive pressure transducer 81 is provided with a hybrid circuit 82.

The cylindrical plate 72 is provided on its outside surface with a hybrid circuit 82. Hybrid circuit 82 may be manufactured separately and bonded to cylindrical plate 72 or may be deposited directly onto cylindrical plate 72 utilizing it as a substrate. The hybrid circuit may be located on any surface having sufficient available area. In some application, it may be desirable to form the hybrid circuit adjacent to the capacitor plates formed on cylindrical plate 72. Thus, the hybrid circuit would be sealed and protected in applications wherein the capacitive chamber was not vented.

Another embodiment of the pressure transducer assembly is disclosed in FIG. 9. In FIG. 9 the capacitive pressure transducer 91 includes two flat surfaced nonconductive insulative disc shaped plates formed such that when placed together a gap 96 of substantially circular cross-section exists between the plate 92 and opposing plate 94. The nonconductive material of which the plates are constructed is preferably one which has approximately a zero hysteresis, such as alumina, fused silica or glass such as Pyrex. In FIG. 9, central conductive layers 6, 8, 10 and 12 are formed substantially as previously described. The plate 92 is formed so that it is substantially thicker than plate 94, with plate 94 acting as a diaphragm. When pressure is applied to the capacitive pressure transducer 91, in essence only plate 94 and accordingly layer 6 is displaced relative to layer 8 thereby varying the capacitance. Circular conductive layers 6 and 8 are applied to the planar inside surfaces of the plate 92 and plate 94 as previously discussed. Also conductive layers 10 and 12 are applied respectively onto each of the plate surfaces in electrical contact with the conductive layers 6 and 8 to form a conductive layer from the central layers 6 and 8 near the outer margin of plates 92 and 94 so that leads 14 and 16 can be coupled respectively to conductive layers 10 and 12. A glass frit 98 which may be either conventional glass frit or a composite glass frit containing a higher temperature glass which acts as a spacer is applied to one or both of the plates with plate 94 being placed in overlying position. The assembled capacitive pressure transducer 91 is then fired fusing the glass frit, spacing and bonding plates 92 and 94 together by a thin glass seal around the margins of the plates. The thickness and ranges of the conductive layers and frit will be discussed in greater detail in the following paragraphs.

Figure 11:
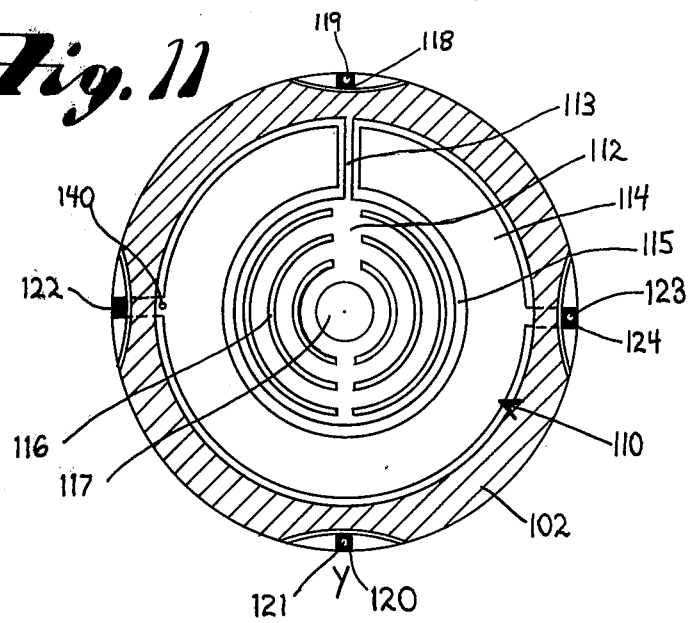
FIG. 11 is a top plan view of the stationary disc of the capacitive pressure transducer shown in FIG. 10.
Figure 12:
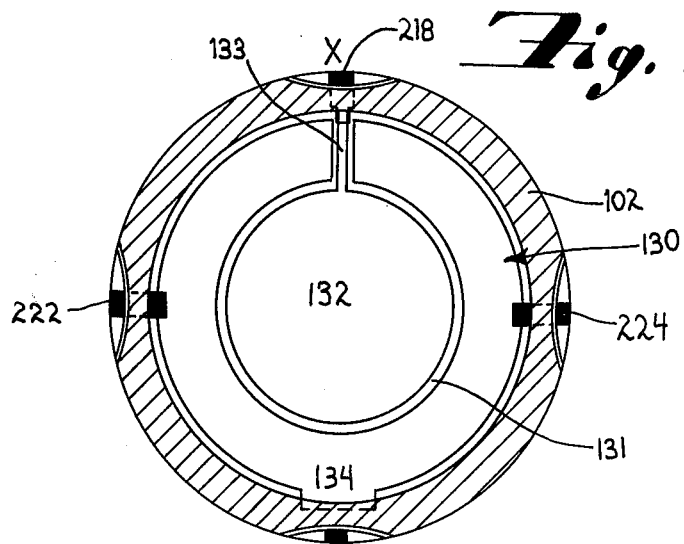
FIG. 12 is a top plan view of the diaphragm disc of the capacitive pressure transducer shown in FIG. 10.

The preferred embodiment and best mode of the invention is disclosed in FIGS. 10 through 12 while the complete assembly is shown in FIGS. 13 and 14. In these figures the capacitive pressure transducer 101 comprises two nonconductive insulative flat surfaced members spaced and sealed together by a glass frit 102 so that the members when sealed together create a predetermined gap 104 of about 0.00155 inches ±0.0001 inches between the diaphragm member 106 and the stationary substrate member 108. The members can be constructed of fused quartz, high purity alumina of about 96% purity. The requirements for the material are that it has hysteresis free operation, elasticity with necessary tensile strength, and temperature stability. The preferred material which presents an acceptable material interface is high purity alumina. In this preferred embodiment the stationary substrate member 108 is several times thicker than the diaphragm member 106. The stationary substrate member as seen in FIG. 11 has a conductive plate 110 comprising a central conductive plate 112 having a radially extending conductive path 113 electrically connected to lead contact 118. A guard ring plate 114 substantially surrounds plate 112 with the inner periphery of guard ring plate 114 being separated from the outer periphery of conductive plate 112 and its radiating pathway 113 by a nonconductive space 115 having a width ranging from 0.015 to 0.030 inches. The conductive plate material comprises fired gold, screened and fired on the flat member surface in a thickness ranging from 500 to 2500 angstroms. The lead contacts 118, 120, 122 and 124 are separately screened and fired on the member flat surface in a somewhat thicker range. The reason for the double screening is that pure gold material of the lead contact can be leached into the frit glass or plate material making it nonconductive. It should also be noted that platinum can be substituted for gold as the electrically conductive medium, and because of its superior leach resistance only a single screening can provide 112, 113, 118, 120, 122 and 124.

A glass frit 102 having a thickness of about 0.0015 inches is screened and dried on the outer margin of the stationary substrate plate in an annular configuration. The frit is applied so that it does not cover lead holes 119 and 121 defined by contacts 118 and 120 respectively by more than half their diameter, allowing respective lead wires 126 and 128 to be inserted therein. The applied frit also leaves a portion of the ground lead contacts 122 and 124 exposed. The central conductive plate 112 is screened onto the planar surface of the stationary substrate member with a series of nonconductive semi-circular spaces 116 and a central circular nonconductive section 117 formed in the plate 112, so that the diaphragm central conductive plate 132 cannot bottom out at the center point 117 of the substrate member. It should be noted that this central section 117 can have any desired shape which accomplishes the desired function. This center area 117 preferably is about 11 percent of the central conductive plate area 112, but can range from 5 to 30 percent of the total central conductive plate area to obtain accurate measurements. Ground contacts 122 and 124 provide leads to the outer guard ring 114. An opening 123 is formed exterior of the frit in contact 124 for inserting an external test lead. An evacuation bore 140 as better shown in FIG. 10 leads into the capacitor chamber through the guard ring 114 and is sealed over by a glass sealing bead 142 so that the chamber can be placed in a vacuum, or with one or more atmospheres of pressure depending upon the use desired.

The diaphragm member 106 is composed of the same material as the substrate member 108 with the conductor plate 130 being constructed by screening fired gold onto the flat planar surface in the thicknesses previously described.

Glass frit 102 is screened onto the margin of the planar surface of the diaphragm member 106 around the periphery of the guard ring in the same manner as was the case in the substrate member. However, it is apparent various frit thicknesses can be used for either plate as long as the gap between the plates created by the fused frit preferably ranges between 0.00145 inches and 0.00165 inches. However the gap between the plates has been found to be workable between 0.001 and 0.002 inches. The conductive plate 130 screened onto the flat surface of the diaphragm member in the thickness and manner previously discussed regarding the substrate member so that it is separated in a central conductive plate 132 with an outward radiating path 133 and an outer guard ring 134 by a nonconductive space 131 having a width ranging from 0.015 to 0.030 inches. It should be noted that point X of the diaphragm member is to be positioned directly opposite and facing point Y of the substrate member in assembly of the member to form the capacitive transducer. Ground contacts 222 and 224 are disclosed leading to the guard ring 134. These contacts function in the same manner as contacts 122 and 124. Contact 218 is electrically connected to the central conductive plate 132 by pathway 133. It should be noted that contacts 218, 222 and 224 formed between the diaphragm member surface and the frit 102 provide electrical connection through the frit to the central conductive plate 132 and guard ring 134 respectively.

The complete pressure transducer sensor assembly 150 is shown in FIG. 14. The pressure assembly system comprises pressure transducer 101 previously described in the preceding paragraphs, and a laser trimmed electronic circuit 152 which is secured to an appropriate side of the sensor 101 which in the prreferred embodiment is the stationary substrate side. It should be noted that the electronic circuit has leads 154 and 156 which can be connected to leads 126 and 128 of sensor 101 or which may be substituted for those leads. An upper sealing gasket 158 is placed over the electronic circuit 152 and substrate plate and a lower sealing gasket 160 is placed over the diaphragm section. The gaskets are held in place by an electrical shield and cover 162 which is mounted to the upper sealing gasket 158 at 164. An electrical shield and bezel 166 is mounted over the lower sealing gasket 160 so that rim 168 of the lower sealing gasket protrudes therethrough with a flange 170 of the electrical shield 166 resting on an annular seat 172 of the lower sealing gasket. Two of the transducer assemblies 150 are then mounted into a housing not shown which connects them to the vent and manifold of an internal combustion engine. The rear of the hybrid electronics member 152 is connected to a printed circuit board assembly to control the electronic ignition of the internal combustion engine.

In the above-described embodiments of the capacitive pressure transducer and particularly the preferred embodiment, gaps between the plates on the order of 0.00145 to 0.00165 inches are practical. Typically, the deflecting portion of the plates of the diaphragm when made from alumina has a thickness ranging from approximately 0.001 to 0.500 inches. Furthermore, the thickness of the plates and the width of the gap can be designed such that under high overload pressures the two discs bottom out against each other thereby preventing damage to the pressure sensor. Also it should be apparent to one skilled in the art that the physical shape of the plates is not determinative of the invention and that the pressure transducer could be just as easily made from square or rectangular plates of a nonconductive or insulating material. Furthermore, the central conductive layer need not be circular and also could be square, rectangular or any other shape required.

In all cases it is understood that the above-described embodiments are merely illustrative of a number of the many possible specific embodiments which can represent applications of the principles of the present invention. Numerous and various other arrangements can be readily devised in accordance with these principles by those skilled in the art without departing from the scope of this invention.

What is claimed is:

1. A pressure sensor for use over a predetermined continuous pressure measurement range in environments subject to periodic high overload pressure comprising:
   first and second ceramic insulating members having flat opposed parallel surfaces, one of said members being relatively thin with respect to the other member and being flexible when exposed to pressure;
   a thin electrically conductive plate deposited on each of said insulating members flat opposed parallel surfaces facing one another, one of said plates defining a plurality of spaced apart non conductive cutout areas:
   means for establishing an open gap between said electrically conductive plates, said open gap ranging between 0.1 and 20 milinches, said means consisting of fused glass frit positioned around the marginal edge portion between said two members, said fused glass frit also hermetically sealing the space between said members to form a chamber; and
   means including said members and said fused glass frit for permitting said electrically conductive plates to deflect toward one another without touching throughout said predetermined measurement range, while allowing said plates to bottom out under high overload pressure conditions, so that said pressure sensor is protected against mechanical impairment and means including a cut-away central portion of the plate deposited on the thicker of said members for preventing electrical engagement of said two plates when said plates bottom out under high overload pressure conditions.

2. A pressure sensor comprising:

first and second ceramic insulating disc-shaped members having flat opposed surfaces, one of said members being relatively thick in comparison with the other of said members;

thin electrically conductive plates ranging from 1500 to 2500 angstroms in thickness formed on each of said insulating members and facing one another in a parallel relationship, said plates being formed in a plurality of concentric sections comprising an inner central section and an outer section separated from each other by a non-conductive area, the inner central section of said thicker insulating member defining a central non-conductive cut-out portion and a plurality of symmetrical non-conductive cut-out portions spaced away from said central portion; and glass frit means positioned on the outer margins of at least one of said members for establishing an open gap between said thin conductive plates, of between 0.001 and 0.002 inches while sealing said gap area to form a chamber.

3. A pressure sensor for use over a predetermined continuous pressure measurement range in environments subject to periodic high overload pressure comprising:

first and second ceramic essentially zero hysteresis insulating members having flat opposed surfaces, one of said members having a thickness less than the other member and being flexible when acted upon by a pressure;

an electrically conductive circular plate formed on each of said insulating members, said plates facing one another in a spaced-apart parallel relationship, said plate on the thicker of said insulating members defining a plurality of arcuate non-conductive cut-out areas in said plate and also defining a central circular nonconductive cutout area in said plate;

a conductive guard plate surrounding said plate on said thicker member, said guard plate being spaced apart from said conductive plate by a concentric nonconductive area;

means for establishing an open gap between said flat conductive plates, of between 0.00145 to 0.00165 inches, said means comprising fused glass frit between said two members, said fused glass frit also hermetically sealing the space between said member to form a chamber containing said plates; and means including said members and said fused glass frit for permitting said plates to deflect toward one another without touching throughout said predetermined measurement range and to permit said plates to bottom out under high overload pressure conditions, so that said transducer is protected against electrical and mechanical impairment.

4. A capacitive pressure transducer comprising, in combination, a pair of planar surfaced essentially zero hysteresis nonconductive electrically insulative members, one of said electrically insulative members comprising a flexible diaphragm, the other of said electrically insulative members comprising a rigid member, said electrically insulative members being disposed in vertically aligned, stacked relationship with marginal edge portions in overlying relationship and with said inner surfaces in spaced apart parallel relationship to define a gap, seal means comprising a fused glass frit having a thickness ranging from 0.001 to 0.002 inches bonding and spacing said overlying edge portions together in sealed relationship to form a sealed chamber, a planar layer of electrically conductive material secured on each of said inner surfaces, each of said layers of conductive material comprising a central circular conductive portion and a co-planar conductive path portion extending from said central portion through said seal means and to the marginal periphery of said insulative members for connection to external leads, the central conductive portion of said conductive material on the inner surface of said rigid member defining a plurality of symmetrical cutout nonconductive areas, said central conductive portions on said inner surfaces being disposed in vertically aligned spaced apart parallel relationship to form a capacitor having a capacitance which varies according to the flexing of said elastic diaphragm in response to pressure, with the gap and diaphragm being constructed to enable said diaphragm to bottom out when a pressure in excess of a predetermined pressure is applied to the transducer.

* * * * *